(No Model.) 2 Sheets—Sheet 1.

J. W. CLOUD.
TRUCK FOR CARS, &c.

No. 560,258. Patented May 19, 1896.

Witnesses:
Charles E. Tetley.
H. W. Munday.

Inventor:
John W. Cloud
By his Attorneys
Munday, Evarts & Adcock.

(No Model.) 2 Sheets—Sheet 2.
J. W. CLOUD.
TRUCK FOR CARS, &c.
No. 560,258. Patented May 19, 1896.
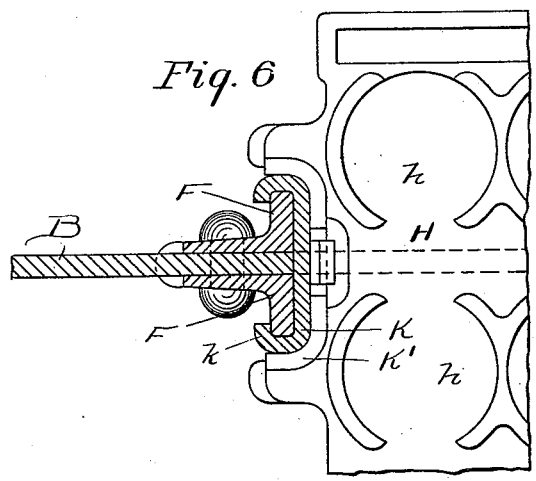
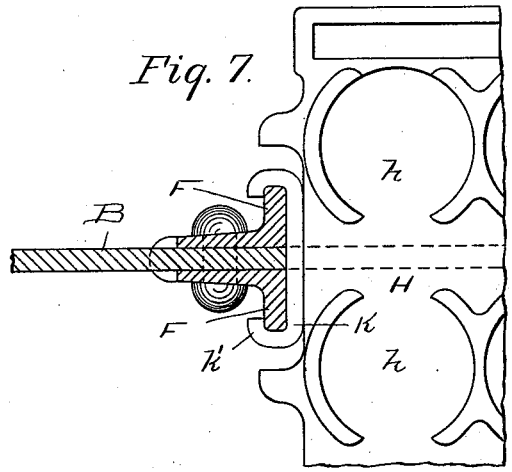
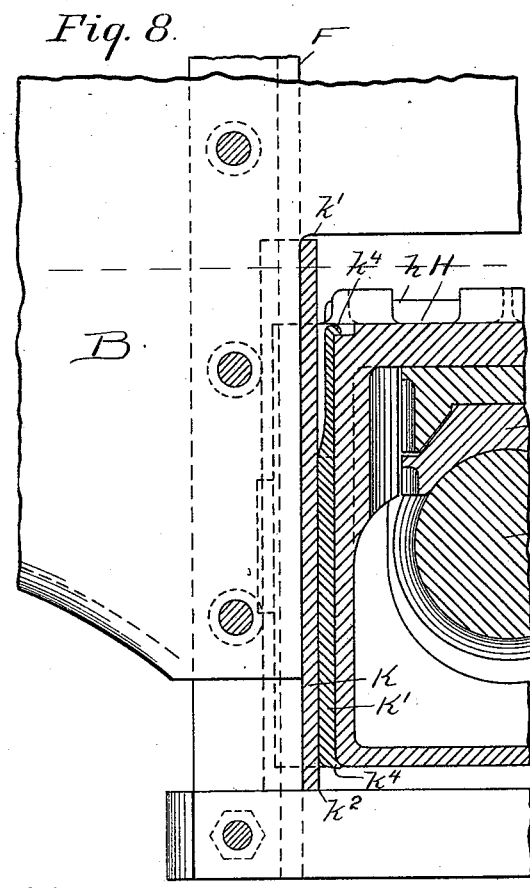
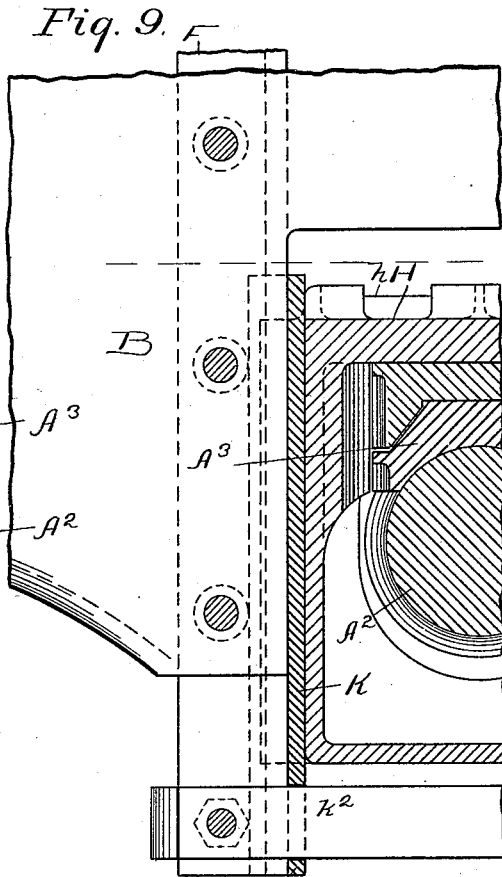
Witnesses;
Charles E. Tetley.
H. W. Munday,
Inventor;
John W. Cloud.
By his Attorneys.
Munday, Evarts & Adcock.

UNITED STATES PATENT OFFICE.

JOHN W. CLOUD, OF CHICAGO, ILLINOIS.

TRUCK FOR CARS, &c.

SPECIFICATION forming part of Letters Patent No. 560,258, dated May 19, 1896.

Application filed February 15, 1896. Serial No. 579,392. (No model.)

*To all whom it may concern:*

Be it known that I, JOHN W. CLOUD, a citizen of the United States, residing in Chicago, in the county of Cook and State of Illinois, have invented a new and useful Improvement in Trucks for Cars or other Vehicles, of which the following is a specification.

My invention relates to the construction of trucks for vehicles, and more particularly to those made of pressed or rolled steel plates.

Heretofore in the construction of steel car-trucks it has been customary to cut away the side plates of the truck over the journal-boxes to form a cavity for the reception of the springs and then to strengthen the truck side thus weakened by being cut away by securing to it a bent angle or T iron guide-piece or pedestal shaped to surround the cavity or opening thus formed.

My invention consists in forming the truck side with only a small cut-away portion above the journal-box just sufficient to give the necessary clearance for the play of the springs and in then mounting the springs on either side of the truck side plate, by which means the strength of the truck side plate is preserved, it not being injuriously cut away, and I thus obviate the necessity for using the expensive bent angle or T iron guide heretofore employed to strengthen the truck side plate.

My invention also consists in the novel construction of parts and devices and in the novel combinations of parts and devices herein shown and described and more particularly specified in the claims.

Figure 1:
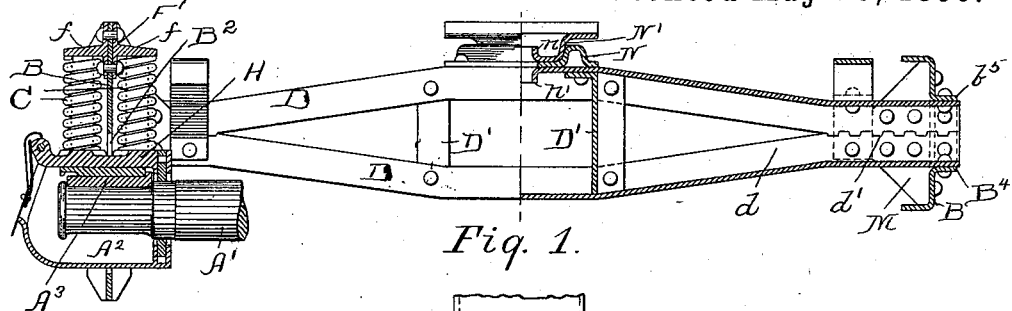
Figure 2:
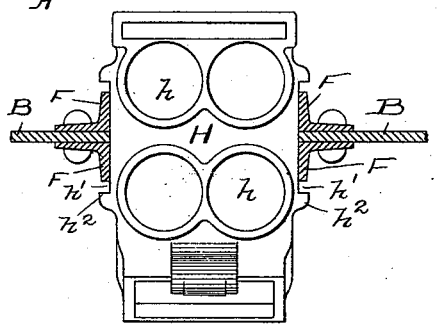
Figure 3:
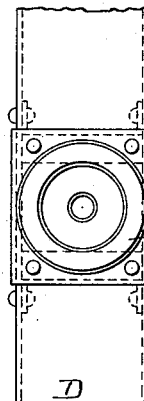
Figure 3:
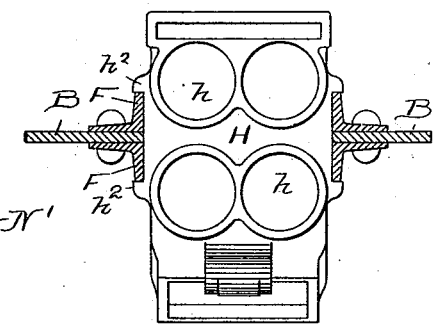
Figure 4:
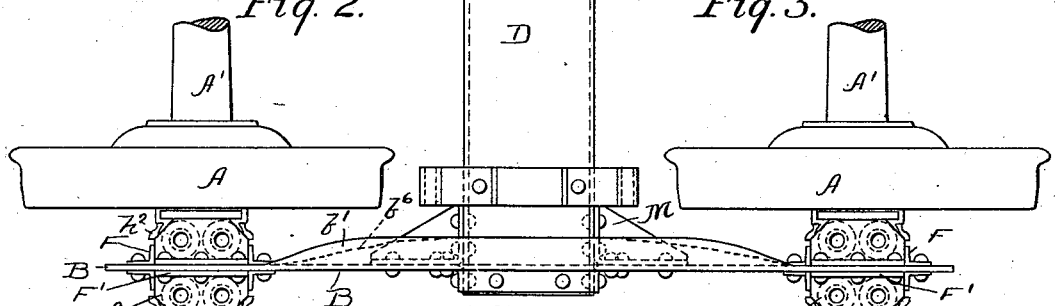
Figure 5:
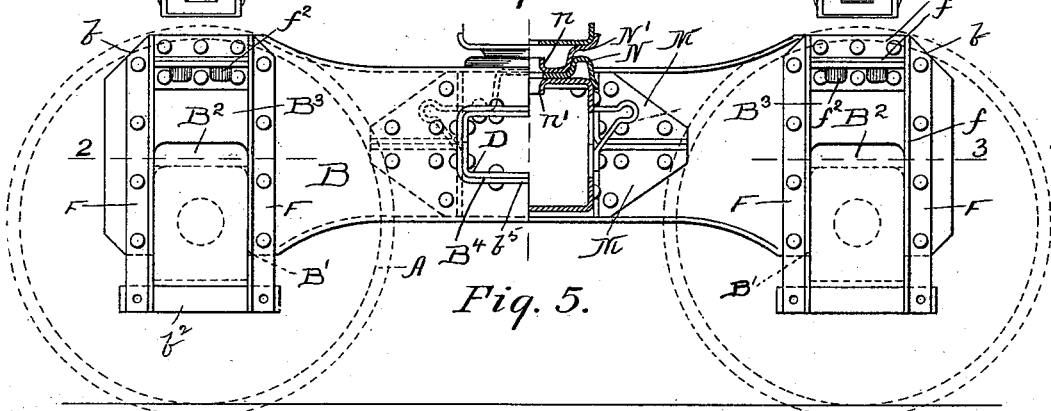

In the drawings, Figure 1 is a partial vertical section taken in part centrally through one of the journal-boxes and in part centrally through the truck-bolster. Fig. 2 is a horizontal section taken on line 2 3 of Fig. 4. Fig. 3 is a view similar to Fig. 2, showing a slightly-modified construction. Fig. 4 is a plan view of a portion of the truck; Fig. 5, a side elevation, partly in section. Fig. 6 is a detail horizontal section showing the shoes for the angle-iron guides, and Fig. 8 is a detail vertical sectional view of the same; and Figs. 7 and 9 are views similar to Figs. 6 and 8, respectively, showing the use of single instead of double shoes.

In the drawings, A represents the wheels of a car-truck, A' the axles, $A^2$ the journals, and $A^3$ the journal-boxes, these parts being of any ordinary or suitable construction.

B represents the side plates of the truck, and D the bolster extending between the side plates.

The side plates B of the truck (only one of them being shown in the drawings, as they are both exactly similar) are each formed from a rectangular blank of steel plate without any material waste by simply clipping off its corners, as shown at $b$, and turning flanges $b'$ at the middle portion of the plate at is upper and lower edges, as is clearly shown in Figs. 5 and 4. To give greater flexibility laterally, the flanges $b'$ taper out at the two ends of the side plate adjacent to the journal-boxes, where the side plate is left at its full depth or width, as will be readily seen and understood from Figs. 5 and 4.

$B'$ $B'$ are the cavities cut out of the side plate to receive the journal-boxes, these cavities or cut-away portions being comparatively small and just enough to receive the journal-box and give the necessary clearance-space $B^2$ between the journal-box and the side plate for the play of the springs. By this construction I leave a sufficient width or portion $B^3$ of the side plate uncut away above the journal-box to afford the necessary strength for the side plate at this part, so that I am enabled to dispense with the customary bent angle or T iron guides heretofore employed for surrounding and strengthening the side plate at this cut-away part.

The springs C C, which are usually and preferably four in number, I place on either side of the side plate B, the side plate thus extending between the springs. The angle-iron guides F F, I preferably form in separate pieces, as shown in the drawings, one on each side of the journal-box, the same being securely riveted to the truck side B, and an angle or T iron piece or guide F', having a wider horizontal flange $f$ than the corresponding flange $f'$ of the upright guides F to form a bearing for the top of the springs C, extends across horizontally between the guides F F. This spring bearing-plate F' is securely riveted to the truck side plate B and is provided with lugs or projections $f^2$ $f^2$ to fit inside the springs to hold them in place. These lugs or projections are preferably stamped or pressed in the plate F'. Seats $h\,h$ are formed on the lower bearing-piece H for the springs, which forms the top of the journal-box.

Preferably a certain amount of play (indicated at $h'$) is left between the vertical guides $h^2$ on the journal-box and the angle-iron guides F F on the truck side B. This is clearly indicated in Figs. 4 and 2. This permits a certain endwise play of the axle and its journal-box, and provision for the same play is also allowed between the springs and the side plate B, which fits between the springs, the springs being slightly separated for this purpose, as indicated in Fig. 1, so that the side plate B will not strike the springs when the springs move with the axle and its journal-box in the endwise play of the axle.

In the modification shown in Fig. 3 no provision for play of the axle endwise is made, as the guides $h^2\,h^2$ on the journal-box fit the guides F F on the side plate B closely. This construction prevents the cross strain on the springs, caused by the endwise play of the axle, and which cross strain on the springs is what is usually relied upon to bring the axle back to its central position, as shown in the drawings in Figs. 1 and 4.

To prevent wear between the angle-iron guides F F on the side plate B and the lugs or guides $h^2\,h^2$ on the journal-box, I provide shoes K K', one or both, as may be preferred. These shoes, one or both, may be used either in the construction where no provision is left for endwise play or in the construction where such provision is made. The former construction I have shown in Figs. 6 and 8, the latter in Figs. 7 and 9.

The shoe K is preferably furnished with flanges $k\,k$, embracing the angle-iron guides F F, or other suitable means for holding it in place laterally, and it is held in place vertically by abutting against suitable upper and lower stops, as $k'\,k^2$, or other suitable means, the lower stop $k^2$ being in this case the cross-bar at the bottom of the box. As illustrated in Fig. 9, the shoe K is held in place against movement vertically in both directions by the cross-bar $k^2$, the shoe having a lug or part $k^3$ fitting below the cross-bar $k^2$. The shoe K it will thus be seen may be easily removed and renewed with a new one when worn without taking the weight off the box by simply driving or slipping it downward or upward from below, the hinged cross-bar $k^2$ being of course swung open or removed. The shoe K', in cases where two shoes are employed, as shown in Figs. 6 and 8, is secured to the journal-box, this being done by any suitable means—as, for example, by turning lips $k^4$ on the upper and lower edges of the shoe.

The bolster D may be of any suitable or known construction. I prefer, however, to form it of two channel-bars spread apart at the middle by suitable struts or spacing-pieces D' D' and having their flanges $d$ notched or serrated at their meeting ends, as shown at $d'$, and held together by tie-pieces or other suitable means.

The truck side plates B are each provided with a flanged opening $B^4$ at their middle to receive the end of the bolster D, the opening being formed by forming a small opening or slit and turning the edge of the plate surrounding the same outward into a flange $b^5$, which flange is securely riveted to the bolster, as shown in Figs. 1 and 4. To further strengthen the connections thus formed between the bolster and the truck side, I rivet brace-pads or angle-pieces M both to the truck side and to the bolster.

The bolster D is provided at its middle with a lower center plate N and an upper center plate N', the lower being secured by rivets or otherwise to the bolster. The upper center plate N' is provided with an upturned flange $n$, surrounding the hole for the center pin to prevent the edge of the center plate from cutting or wearing the center pin and to give a better bearing against the pin, and the bolster D is provided with a similar downturned flange $n'$, surrounding the pin-hole for the same purpose.

The truck side B, as will be seen from the drawings, is furnished with comparatively narrow flanges $b'\,b'$ at its upper and lower edges for the purpose of making this truck side plate flexible laterally. This elastic flexibility laterally in the truck side is of great importance in softening the shocks and increasing the durability of the truck construction as a whole, as well as tending to relieve the journal-bearings from excessive endwise pressure and wear. To increase this lateral flexibility of the truck side, I sometimes make the flanges $b'\,b'$ narrower than indicated in the drawings, as indicated in the dotted lines $b\,b$ of the drawings, or, if preferred, these flanges $b'\,b'$ may be entirely omitted at the top and bottom of the truck side plate.

I claim—

1. In a car-truck, the combination with the journal-box of a pressed or rolled steel side plate extending across the journal-box about central thereto, and having a small cut-away part or opening above the journal-box to give sufficient clearance for the play of the springs, and springs located over the journal-box on each side of said side plate so that the weight will be distributed uniformly on the journal, substantially as specified.

2. In a truck, the combination with the journal-box and springs located over the journal-box on each side of the truck side plate, of a truck side plate extending between said springs and having a cut-away part above the journal-box sufficient to give clearance for the play of the springs, substantially as specified.

3. In a truck, the combination with the journal-box and springs resting thereon, of a side plate extending between the springs centrally over the journal-box and having a sufficient clearance between its lower edge and the journal-box for the play of the springs, and top bearing-plates for said springs secured to said side plate at each side thereof near its upper edge, substantially as specified.

4. In a truck, the combination with the journal-box and springs resting thereon, of a side plate extending between the springs centrally over the journal-box and having a sufficient clearance between its lower edge and the journal-box for the play of the springs, and top bearing-plates for said springs secured to said side plate at each side thereof near its upper edge, and angle-iron guides formed in separate pieces and attached to said side plate at each side of the journal-box, substantially as specified.

5. The truck side plate herein shown and described, formed from a rectangular blank of plate-steel, and provided with the bearing-plates F' F' for the springs secured thereto one on each side thereof near its upper edge, and having also angle-iron guides F F in separate pieces attached thereto, substantially as specified.

6. In a truck, the combination with a bolster provided with a downwardly-turned flange surrounding the hole for the center pin, of a lower center plate and an upper center plate provided with an upturned flange surrounding the hole for the center pin, substantially as specified.

7. In a car-truck, the combination with the bolster of a pressed-steel center plate having a right-angle flange surrounding the hole therein for the center pin, substantially as specified.

8. In a truck, the combination with the axles and journal-boxes and bolster, of a laterally-flexible truck side having narrow flanges at its upper and lower edges, substantially as specified.

9. In a car-truck, the combination with the journal-box and its lugs or guides, of a side plate provided with guides moving between the lugs or guides on the journal-box, springs interposed between the truck side plate and the journal-box, and adapted to permit a limited endwise play of the axle and journal-box, there being also provided a clearance-space or play between the lugs or guides on the journal-box and those on the side plate to permit said limited endwise play of the axle, substantially as specified.

JOHN W. CLOUD.

Witnesses:
H. M. MUNDAY,
EDMUND ADCOCK.